United States Patent [19]
Schaeffeler et al.

[11] Patent Number: 6,104,105
[45] Date of Patent: Aug. 15, 2000

[54] ELECTRICAL SWITCH

[75] Inventors: Alois Schaeffeler, Spaichingen; Gerhard Niklewski, Trossingen; Paul Leibinger, Rietheim-Weilheim, all of Germany

[73] Assignee: Marquardt GmbH, Rietheim-Weilheim, Germany

[21] Appl. No.: 09/142,589

[22] PCT Filed: Mar. 13, 1997

[86] PCT No.: PCT/DE97/00511

§ 371 Date: Sep. 11, 1998

§ 102(e) Date: Sep. 11, 1998

[87] PCT Pub. No.: WO97/37364

PCT Pub. Date: Oct. 9, 1997

[30] Foreign Application Priority Data

Mar. 15, 1996 [DE] Germany .............................. 196 10 325
Mar. 15, 1996 [DE] Germany .............................. 196 10 326

[51] Int. Cl.[7] .................................................... H01H 47/00
[52] U.S. Cl. ............................ 307/125; 388/937; 200/522
[58] Field of Search .......................... 318/9, 11; 338/179, 338/198, 199, 200; 307/125; 388/937; 200/43.17, 447, 448, 522

[56] References Cited

U.S. PATENT DOCUMENTS

| | | | |
|---|---|---|---|
| 4,095,072 | 6/1978 | Piber | 200/157 |
| 4,286,125 | 8/1981 | Schäffeler et al. | |
| 4,523,176 | 6/1985 | Leibinger et al. | |
| 5,289,047 | 2/1994 | Broghammer | 307/125 |

FOREIGN PATENT DOCUMENTS

| | | |
|---|---|---|
| 0 199 983 A1 | 12/1986 | European Pat. Off. . |
| 0 512 316 A2 | 11/1992 | European Pat. Off. . |
| 28 38 934 | 3/1980 | Germany . |
| 31210-33 A1 | 12/1982 | Germany . |

*Primary Examiner*—Fritz Fleming
*Assistant Examiner*—Robert L. Deberadinis
*Attorney, Agent, or Firm*—Venable; Robert Kinberg; Catherine M. Voorhees

[57] ABSTRACT

An electrical switch includes a housing having first and second input connections for electrical connection to a voltage source and the housing further has first and second output connections for electrical connection to an electrical device. The second input connection has an electrical connecting part for connection to the second output connection. The electrical switch also has an operating element which can be moved manually and at least one contact system which includes a fixed contact and a contact rocker. The contact rocker has first and second lever arms and a rotating bearing. The first lever arm is in communication with the fixed contact. The fixed contact is directly connected to the first input connection. The operating element, during its movement, acts upon the second lever arm in such a way that the first lever arm can be placed against the fixed contact in order to close an electrical connection of the contact system. The electrical switch further has a current carrying rail, having first and a second ends, located in the housing for establishing an electrical connection to the first output connection. The first lever arm is biased by a spring force in a closing direction toward the fixed contact. The rotating bearing is arranged on the current carrying rail near the first and second input connections. The current carrying rail extends from its first end from the region between the first and second input connections to its second end in the region of the first output connection and is located in approximately the center of the housing and passes through the housing in a direction approximately at right angles to the direction of movement of the operating element.

20 Claims, 11 Drawing Sheets

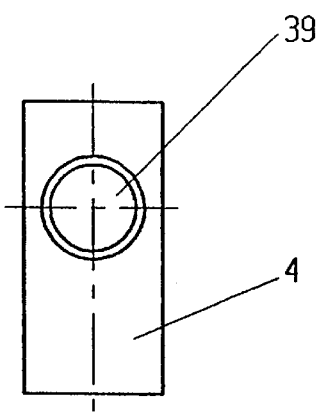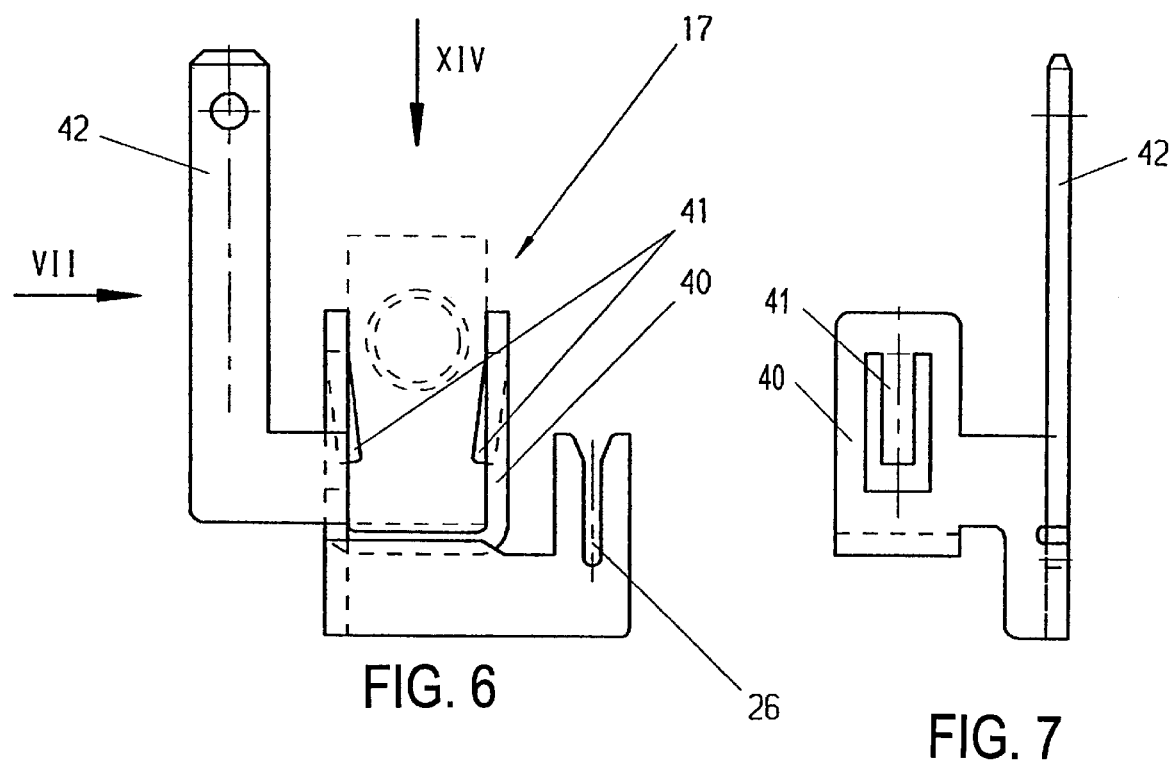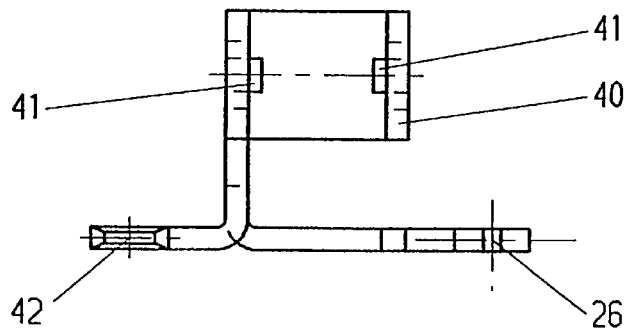

ELECTRICAL SWITCH

FIELD OF THE INVENTION

The invention relates to an electrical switch.

BACKGROUND OF THE INVENTION

Such electrical switches are used for switching on and off electrical devices supplied by a voltage source. In particular, some switches are used in electrical tools having an electric motor. A switch may also contain a control electronics device so that, in addition to switching the electric motor on and off, it is also possible to use the switch to adjust the rotation speed of the electric motor to correspond to a nominal value which can be preset.

DE-A1-28 38 934 discloses an electrical switch for switching on and off as well as for adjusting the rotation speed of an electric motor. The switch has a housing with two input connections located on or in the housing for the electrical connection to the voltage source, and two output connections for the electrical connection to the electric motor. The control electronics device and two contact systems, which each comprise a fixed contact as well as a switching contact, are arranged in the housing. The switching contact is, in turn, designed as a contact rocker having two lever arms and a rotating bearing, the first lever arm, which interacts with the fixed contact, being loaded by a spring force in the closing direction toward the fixed contact. An operating element which is designed as a push button and can be moved manually is located on the housing. During its movement, the operating element acts on the second lever arm on the switching contact of the respective contact system in such a manner that the first lever arm can be placed against the fixed contact in order to close the electrical connection of the contact system. Furthermore, the operating element interacts with the control electronics device, so that a rotation speed corresponding to the setting of the operating element can be set on the electric motor by the control electronics device.

A further electrical switch for switching on and off as well as for adjusting the rotation speed of an electric motor is disclosed in DE-C2-40 38 787. The housing of this switch contains a control electronics device, as well as two contact systems, which are each composed of two fixed contacts and a spring-loaded contact link.

The first fixed contact is arranged on a contact path, which is connected to an input connection, and the second fixed contact is arranged on a contact bracket, which is connected to the control electronics device. The contact link is placed by the operating element against the two fixed contacts, via a switching stud, in order to close the electrical connection of the contact system. The contact system of this switch is sensitive to tolerances and is also complex to assemble.

In handheld electrical tools, such switches are generally installed in the handle. Owing to their functionality, the known switches have a complex design, so that the housing needs to have a certain physical size, which in turn has to be accommodated in the handle. In many cases, in order to improve the ergonomics of the electrical tool, it is desirable to design the handle to be narrower or thinner. In these cases, the space available for installation may no longer be sufficient for the known switches.

SUMMARY OF THE INVENTION

Proceeding from DE-A1-28 38 934, the invention is based on the object of further-developing the electrical switch in such a manner that a reduction in the size of the space required for installation is achieved, with the same or increased functionality.

This object is achieved in the case of an electrical switch of the generic type by the features of the invention.

The solution according to the invention includes a particular current routing in the switch, as a result of which the housing of the switch can be made smaller. To this end, a current-carrying rail is arranged in the housing, runs approximately in the center of the housing and passes through the housing in the transverse direction, or in a direction approximately at right angles to the movement direction of the operating element. The current-carrying rail in this case accommodates the rotating bearing for the switching contact of the contact system. The current-carrying rail is thus used at the same time as a mechanical bearing part for the switching contact and as an electrical connection in the housing of the switch, as a result of which the housing can be designed to be considerably more compact. There is an electrical connection from the current-carrying rail to the first output connection, but no direct electrical connection to the first input connection. Instead of this, the fixed contact of the contact system is directly electrically connected to the first input connection, and the second input connection has an electrical connecting part for the second output connection. The switch according to the invention is preferably used on a handheld electrical tool which is operated with mains AC voltage, so that the input connections represent the mains connection, and the output connections the field connections for the field winding of the electric motor.

The solution according to the invention contains a particular refinement of the housing interior, resulting in a smaller housing for the switch. If two contact systems are located in the housing interior, then these two contact systems are arranged on mutually opposite sides of the shaft of the operating element and essentially in the transverse direction in the housing interior, the transverse direction designating the direction which is approximately at right angles to the longitudinal direction corresponding to the movement direction of the operating element and runs in the plane of the shaft of the operating element. The length of the housing interior in the longitudinal direction corresponds approximately to the length of the switching contact. The depth of the housing interior running in the depth direction, which is approximately at right angles both to the longitudinal direction and the transverse direction, is slightly greater than the width of the switching contact plus the width of any additional electrical components which may be contained in the housing interior. The depth is preferably approximately up to three times the width of the switching contact.

Further refinements of the invention are the subject matter of the dependent claims.

The first lever arm of the switching contact is loaded by a compression spring or the like in the closing direction toward the fixed contact. A stud on a shaft (which leads into the housing) of the operating element acts on the second lever arm in such a manner that the is switching contact rests against the fixed contact when the operating element has moved through a certain distance.

A control electronics device, which is located on a circuit base, namely a printed circuitboard, a ceramic plate or the like, and has a power semiconductor such as a triac, FET or the like, can be located in the housing in order to adjust the rotation speed of the electric motor. An electrical connection then leads from the current-carrying rail to the control electronics device. A further contact system is used to bridge the control electronics device. An electrical connection leads from the control electronics device to the fixed contact of the further contact system.

The further contact system has a second switching contact, which is designed as a contact rocker and whose rotating bearing is located on the current-carrying rail in the vicinity of the first output connection. The two switching contacts on the current-carrying rail are arranged opposite one another in the transverse direction.

Contact springs, which rest in an elastically sprung manner against a contact surface on the circuit base, are used for the electrical connection of the control electronics device to the current-carrying rail as well as to the fixed contact of the further contact system. To this end, the contact spring has a shape which is approximately in the form of a heart and is open at the side. The contact spring is fastened to an attachment on the fixed contact of the further contact system or of the current-carrying rail, such that it can rotate slightly. To this end, the contact spring can be plugged by means of a U-shaped part, onto the attachment and is, for example, swaged or latched to the attachment, with a certain amount of play being provided.

If a suppression capacitor is required for the electric motor, the housing of the switch itself can be provided for accommodation of the suppression capacitor. To this end, an extension which runs between the two input connections is formed at the start of the current-carrying rail as a first connection for the suppression capacitor, and a second connection for the suppression capacitor is electrically connected to the second input connection. The connections for the suppression capacitor are preferably designed in the form of a plug-in connection.

The fixed contact (which is connected to the first input connection) of the first contact system is advantageously formed integrally with the first input connection. The input connections can thus be designed as a solid part in the form of a block with a receptacle for the supply lead to the voltage source, it being possible for the receptacle to have a screw connection for the fastening of the supply lead. One surface of the part in the form of a block on the first input connection forms the fixed contact. The electrical connecting part on the second input connection comprises a U-shaped connecting part, which is plugged onto the second input connection. In order to ensure a good contact, spring limbs may be located on the U-shaped connecting part, so that the U-shaped connecting part rests with a contact pressure against the part, in the form of a block, of the second input connection. The U-shaped connecting part furthermore has a connecting tab, which is used as the second output connection. At the same time, the second connection for the suppression capacitor is integrally formed on the U-shaped connecting part. The U-shaped connecting part is then expediently formed integrally with the connecting tab and the second connection for the suppression capacitor. The fixed contact for the further contact system can likewise be provided with a connecting tab, which is used as the first output connection. Once again, it is possible to form the fixed contact and the connecting tab integrally.

The current-carrying rail, the input connections, the output connections, the U-shaped connecting part and the other parts are composed of materials having good electrical conductivity, such as copper, brass or other metals.

The current-carrying rail and the first input connection can preferably be composed of copper, the second input connection as well as the U-shaped connecting part of brass, and the contact spring to the circuit base of bronze, beryllium-copper or the like.

The housing is furthermore preferably designed in such a manner that the width of the housing interior running in the transverse direction corresponds essentially to the sum of the heights of the two contact systems and of the diameter of the shaft of the operating element. Instead of the diameter of the shaft of the operating element, the height of a carriage which is located on this shaft and is used to act on the contact systems may also be relevant. If necessary, the height of the input and/or output connection can also be added, if these are likewise arranged in the housing interior.

In a further version, the housing is split, in a plane covered by the longitudinal direction and transverse direction, into a base and a cover. The base is intended to accommodate the contact systems and a current-carrying rail, which is used as an electrical lead between the contact systems, as well as, possibly, the carriage or the shaft of the operating element. A guide and a hold-down device for the carriage can be arranged in the base or in the cover. At least one guide, which runs in the longitudinal direction parallel to the shaft of the operating element, for said operating element, may be located on the outside of the base or of the cover. The operating element engages over this guide, so that a more compact arrangement of the operating element on the housing is possible in the longitudinal direction.

The circuit base for the control electronics device is arranged in a plane, which is covered by the longitudinal direction and transverse direction and runs parallel to the shaft of the operating element, in the housing in such a manner that a wiper which is located on the carriage is in contact with a potentiometer track on the circuit base. A voltage value corresponding to the position of the operating element can thus be tapped off from the potentiometer track and is in turn used by the control electronics device as a nominal value for the rotation speed to be set. In order to reduce the depth of the housing interior, the power semiconductor is arranged unhoused, directly on the circuit base, for example is soldered on the circuit base, as a result of which it is possible to avoid the otherwise considerable addition to the height of a housing for the power semiconductor. The power semiconductor and the component side of the circuit base face the switching contacts, and the circuit base is placed directly or via a heat sink, such as a copper plate or the like, with its side opposite the component side against one wall in the housing interior, for example in the cover.

In order to limit the rotation speed which can be set by means of the operating element, a control wheel can be arranged on the operating element, in order to adjust a stop which interacts with the housing and limits the movement travel of the operating element. Furthermore, a locking slide, which is held on the operating element and is possibly guided on the outside of the housing, can interact with a locking knob in order to lock the operating element in specific movement positions. The locking slide is adjustable by means of the control wheel and is fitted with the stop on the side associated with the control wheel. The locking knob can move in a dome which is located on the outside of the housing, against a spring which is arranged in the dome and enters the locking knob, in such a manner that the locking knob can be completely recessed in the dome. This allows the height of the dome to be reduced and, in consequence, the depth of the housing to be reduced further. The axis of the control wheel is offset in the transverse direction with respect to the shaft of the operating element. The locking slide is likewise arranged offset with respect to the shaft of the operating element in the transverse direction and possibly in the depth direction. This arrangement of the control wheel and of the locking slide in a different way to that in conventional switches once again allows the housing to be designed in a compact manner.

A receptacle for the suppression capacitor may be located directly on the housing, the receptacle being adjacent to the housing in the transverse direction on the side on which the input connections for the switch are located, in such a manner that the suppression capacitor can make contact with associated connections on one of the input connections and the current-carrying rail. The receptacle is preferably composed of two parts which, in particular, are integrally formed with the base and the cover. A cutout toward the outside of the housing can also be located in the receptacle, for a grounding connection on the suppression capacitor.

In the case of a mains-powered electrical tool, it is expedient to fit the cable clamp for the mains cable directly on the housing. The cable clamp is arranged in the transverse direction on the side on which the input connections are located or, possibly, on the receptacle for the suppression capacitor. The cable clamp is preferably integrated integrally in the base of the housing and comprises a cable holder having a projecting web and a clamp which is hooked into the web and can be screwed to the cable holder, in which case the mains cables of different diameters can be accommodated. In order to simplify assembly, the clamp has a weak point already molded on one side of the cable holder, so that the clamp can be broken off during installation of the cable, and can be hooked into the web in order to complete the cable clamp.

For an electrical switch which is intended to be arranged in a thin handle of an electrical tool, it is particularly preferred for the length of the housing interior to be between 18 and 25 mm, the width of the housing interior to be between 30 and 40 mm, and the depth of the housing interior to be between 10 and 20 mm. If there is a receptacle on the housing for the suppression capacitor, then this may have a length of between 20 and 35 mm, as well as a width of between 15 and 30 mm. If a cable clamp is also arranged on the housing, then this cable clamp has a length of between 20 and 30 mm as well as a width of between 10 and 20 mm.

In the case of the switch according to the invention, the current routing in the housing of the electrical switch and/or the housing design are/is optimized such that the housing of the switch may have a compact and thin design. Particularly when a control wheel and a lock are provided on the switch, the housing can nevertheless be kept compact. If the switch is used on a handheld electrical tool, then, owing to the reduced space available for installation of the switch, the handle of the electrical tool can also be designed to be thinner than in the past, which improves the ergonomic aspects of the electrical tool. Further advantages achieved by the invention consist in that a reduction is achieved in the number of parts in the switch, particularly if the input connection is formed integrally with the fixed contact of the contact system, the output connection is formed integrally with the fixed contact of the further contact system, etc. and the cable clamp is integrated on the housing. Further optimization of the current routing and reduction in the number of parts is achieved by the integration of the suppression capacitor in the switch since this avoids the wiring which is otherwise necessary. The reduction in the number of parts in turn results in simplification of assembly and, overall, a reduction in the cost of the switch. Furthermore, the optimized current routing in the switch also contributes to improving the functional reliability of the switch. Finally, the wiring in the electrical tool itself is also simplified.

BRIEF DESCRIPTION OF THE DRAWINGS

Exemplary embodiments of the invention are described in more detail in the following text and are illustrated in the drawings, in which:

FIG. 6 shows the second input connection with the connecting part as an individual part;

FIG. 7 shows the connecting part in the direction VII from FIG. 6;

FIG. 14 shows the connecting part in the direction XIV from FIG. 6; and

DETAILED DESCRIPTION OF THE INVENTION

Figure 1:
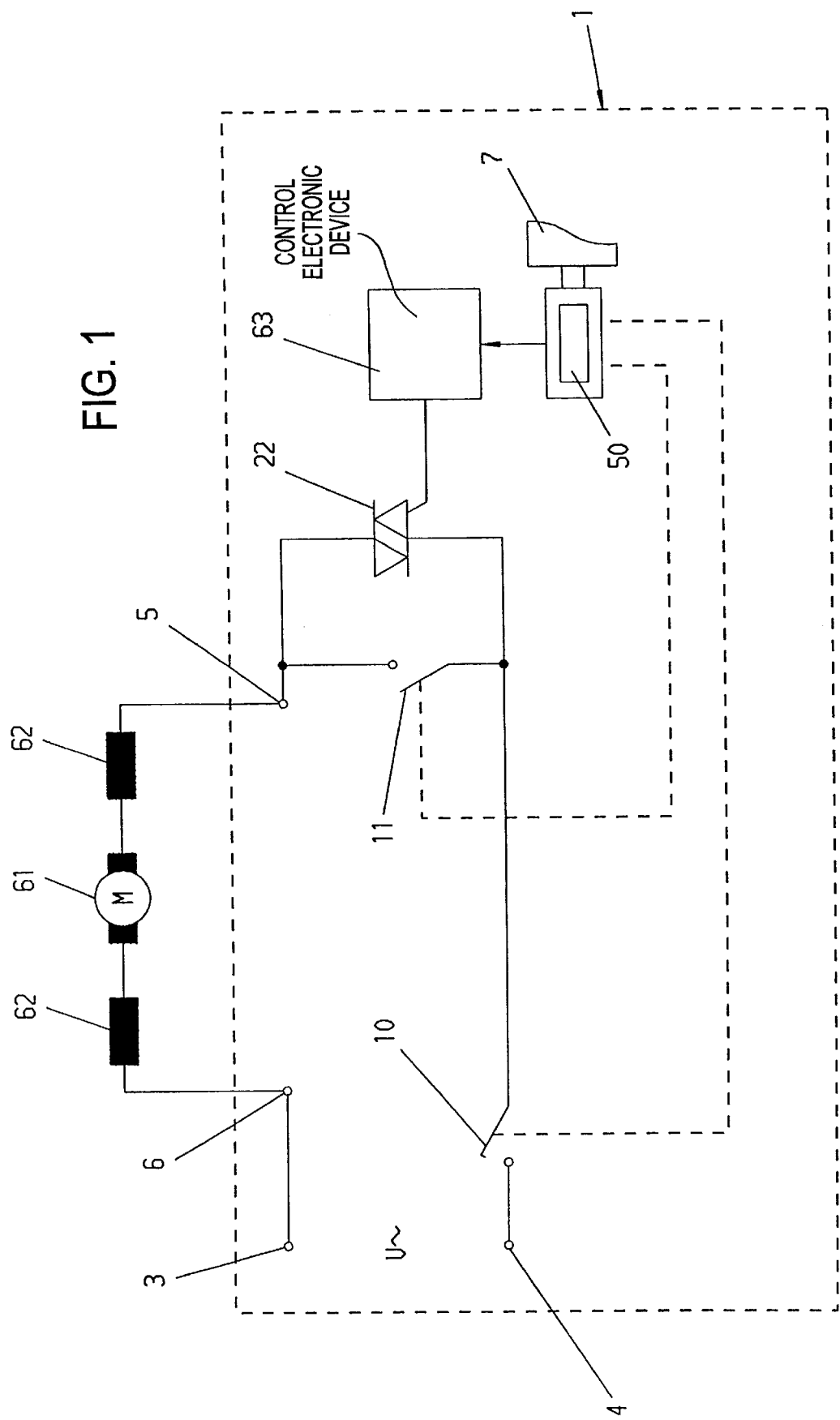
FIG. 1 shows an outline circuit diagram of the arrangement of the electrical switch in an electrical tool.

The electrical switch 1 as claimed in the invention is used in an electrical device which is supplied by a voltage source. The electrical switch 1 is preferably used in an electrical tool, such as a drilling machine, a hammer drill or the like. FIG. 1 shows in more detail the outline circuit diagram for the arrangement of the electrical switch 1 in an electrical tool which is supplied from the mains AC voltage U.

The electrical tool has an electric motor 61 with field windings 62. The electric motor 61 is switched on and off by the user by operating the switch 1 which is located in the handle of the electrical tool, and its rotation speed is adjusted by the user by means of the switch 1. For operation, the switch 1 has an operating element 7 which is designed as a push button and acts on two contact systems 10, 11 and a potentiometer track 50. The rotation speed of the electric motor 61 is adjusted by means of a control electronics device 63 having a power semiconductor 22 such as a triac or the like, which is designed for phase-gating control. When the operating element 7 is moved, the contact system 10 is first closed and the mains AC voltage U is applied via the power semiconductor 22 to the electric motor 61. A control voltage which corresponds to the setting of the operating element 7 is tapped off from the potentiometer track 50 and is supplied to the control electronics device 63. The control electronics device 63 triggers the power semiconductor 22, as a function of this control voltage, at the appropriate phase or currentflow angle of the main AC voltage U so that the rotation speed of electric motor 61 is set, and is regulated, corresponding to the position of the operating element 7. If the operating element 7 is in its maximum position, then the contact system 11 is closed, the control electronics device 63 and the power semiconductor 22 are bridged. The full mains AC voltage U is thus applied to the electric motor 61, and it moves at the maximum rotation speed.

Figure 2:
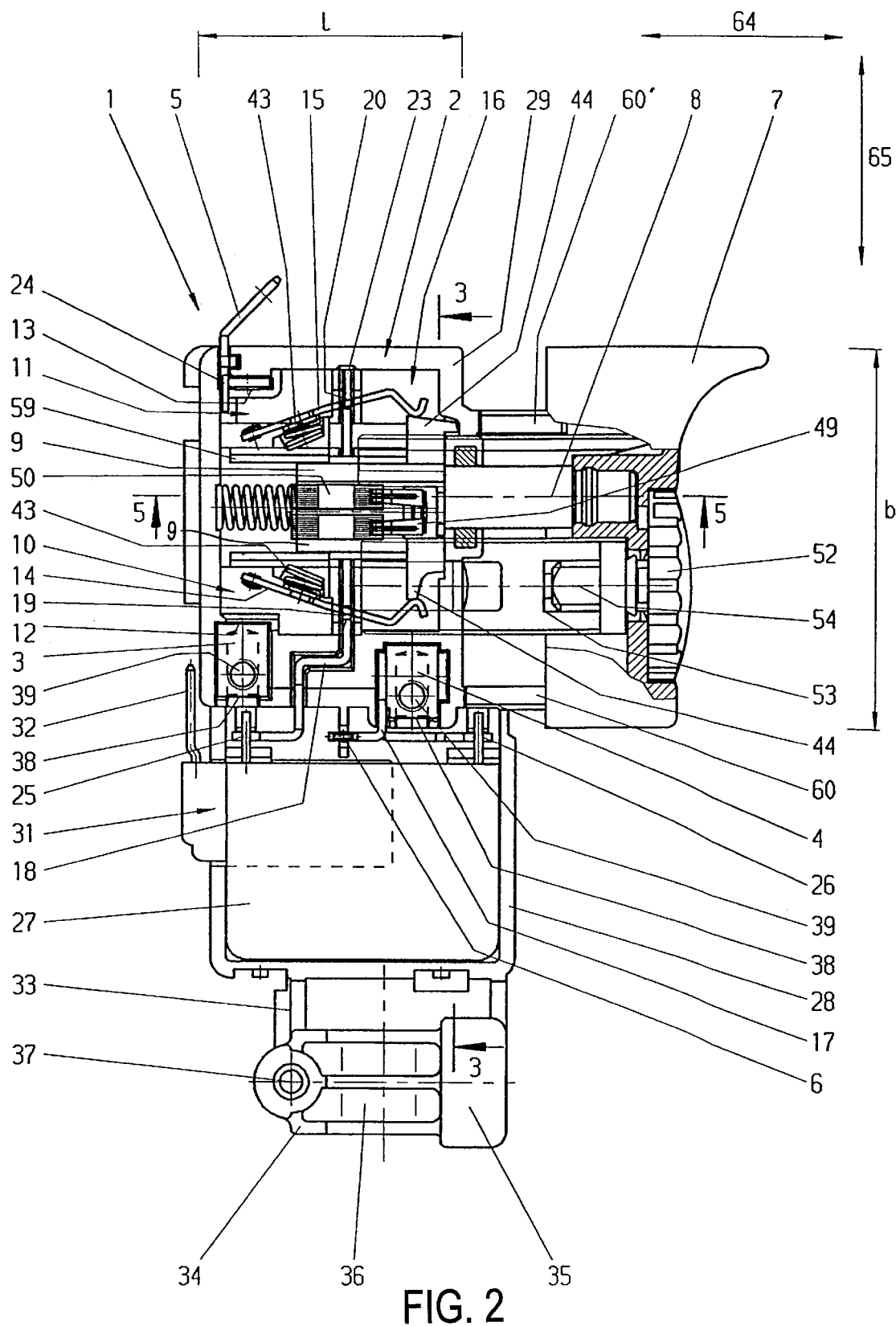
FIG. 2 shows a longitudinal section through an electrical switch for an electrical tool.

In order to accommodate the electrical components, such as the contact systems 10, 11 and the like, the switch 1 has a housing 2, as is evident in more detail from FIG. 2. Located on the housing 2 there are electrical input connections 3, 4 for connection of the switch 1 to the mains AC voltage U, and output connections 5, 6 for connection of the switch 1 to the field windings 62 of the electric motor 61. The input connections 3, 4 are thus used as a mains connection, and the output connections 5, 6 as a field connection. The operating element 7 is attached to a shaft 8 which passes into the housing 2 and can be moved manually by the user against a restoring force which is produced, for example, by a compression spring acting on the shaft 8, the operating element 7 acting on the contact systems 10, 11 during its movement.

The contact systems 10, 11 which are located in the housing interior 16 of the housing 2 respectively comprise a fixed contact 12, 13 as well as a switching contact 14, 15. The switching contact 14, 15 is designed as a contact rocker which is mounted such that it can rotate, has two lever arms and is loaded by the spring force of a compression spring 43 in the closing direction toward the fixed contact 12, 13, in that the compression spring 43 is arranged on the first lever arm, which interacts with the fixed contact 12, 13.

Any other spring, for example a tension spring, can, of course, also be used instead of a compression spring. Each contact system 10, 11 preferably has a stud 44 arranged on a carriage 9 which is located on the shaft 8 (which passes into the housing 2) of the operating element 7. The stud 44 faces the respective contact system 10, 11. The stud 44 acts on the second lever arm of the switching contact 14, 15 in such a manner that the first lever arm of the switching contact 14, 15 rests against the respective fixed contact 12, 13 when the operating element 7 moves through a certain distance, as a result of which the electrical connection of the respective contact system 10, 11 is closed.

If the direction running in the movement direction of the shaft 8 and of the operating element 7 is called, as shown by the arrow 64, the longitudinal direction, and the direction running at right angles to this in the plane of the drawing in FIG. 2, as shown by the arrow 65 is called the transverse direction, then it can be seen in particular from FIG. 2 that the two contact systems 10, 11 are opposite one another in the transverse direction. The two contact systems 10, 11 are also arranged on the mutually opposite sides of the shaft 8 of the operating element 7 in such a manner that they are located essentially one above the other in the transverse direction in the housing interior 16. The current routing in the electrical switch 1 for this arrangement of the contact systems 10, 11 can likewise be seen in more detail in FIG. 2.

The fixed contact 12 of the contact system 10 is directly electrically connected to the first input connection 3. The second input connection 4 has an electrical connecting part 17, which is arranged in the housing 2, for the second output connection 6. The input connections 3, 4 are preferably designed as a solid part, in the form of a block, with a receptacle 38 for the respective mains cable supply lead. The receptacle 38 in turn has a screw connection 39 for fastening of the supply lead. The fixed contact 12 is designed integrally with the first input connection 3 and is integrated in the input connection in that the upper surface on the part in the form of a block of the first input connection 3 itself forms the fixed contact 12. Alternatively, it is also possible to fit a prefabricated contact on this surface. The parts in the form of blocks for the input connections 3, 4 may be produced from copper, brass or the like.

In a development, the electrical connecting part 17 on the second input connection 4 is composed of a U-shaped connecting part 40, as can be seen in FIGS. 6 and 14, which is plugged onto the part, in the form of a block, of the second input connection 4. To this end, the U-shaped connecting part 40 has spring limbs 41 which are cut out from the U-shaped connecting part 40 as can be seen from FIG. 7, so that the U-shaped connecting part 40 rests against the input connection 4 with a certain contact force. Furthermore, the connecting part 40 has a connecting tab 42 which passes through the housing 2 and forms the second output connection 6. The U-shaped connecting part 40 together with the connecting tab 42 can be produced as an integral stamped and bent part, for example from brass.

As can be seen once again from FIG. 2, a current-carrying rail 18 runs in the housing interior 16, essentially in the central region of the housing 2 and essentially in the transverse direction as shown by the arrow 65. The current-carrying rail 18 starts approximately in the region between the two input connections 3, 4 and ends approximately in the region of the first output connection 5, which is essentially opposite the input connections 3, 4. The rotating bearing 19 of the switching contact 14 of the first contact system 10 is arranged on the current-carrying rail 18, like a blade bearing in the vicinity of the input connections 3, 4. The current-carrying rail 18 produces the electrical connection for the second contact system 11, the rotating bearing 20 of the switching contact 15 likewise being arranged on the current-carrying rail 18 in the vicinity of the first output connection 5. The current-carrying rail 18, which is produced as a stamped and bent part, for example from copper, is shown in more detail as an individual part in FIGS. 10 and 11.

Figure 8:
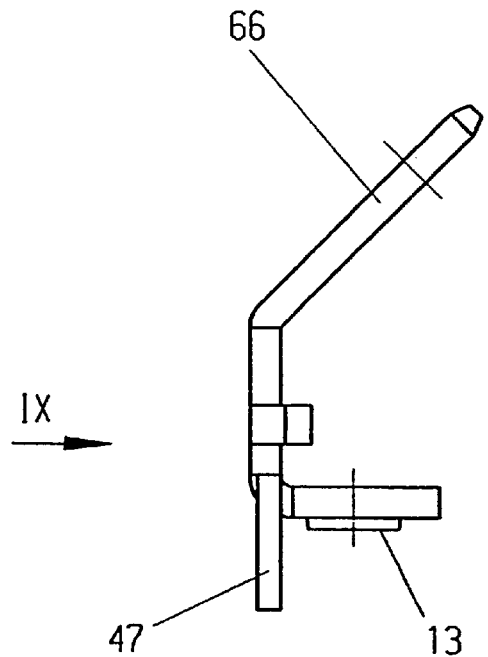
FIG. 8 shows the first output connection as an individual part.
Figure 9:
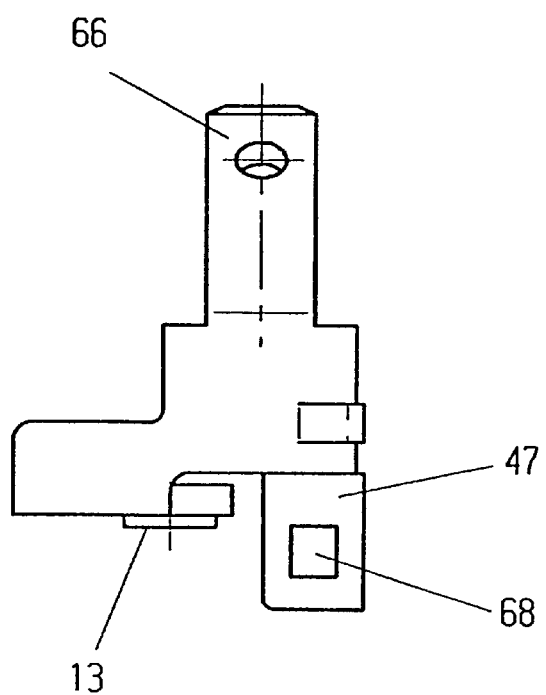
FIG. 9 shows the first output connection in the direction IX from FIG. 8.

The electrical connection from the current-carrying rail 18 to the first output connection 5 is produced via the second contact system 11, with the control electronics device 63 being bridged. The fixed contact 13 for the further contact system 11 is provided with a connecting tab 66 which passes through the housing 2 and is used as the first output connection 5. As can be seen in particular from FIGS. 8 and 9, which show the fixed contact 13 as an individual part, the fixed contact 13 and the connecting tab 66 may be formed integrally as a stamped and bent part, for example from copper.

Figure 4:
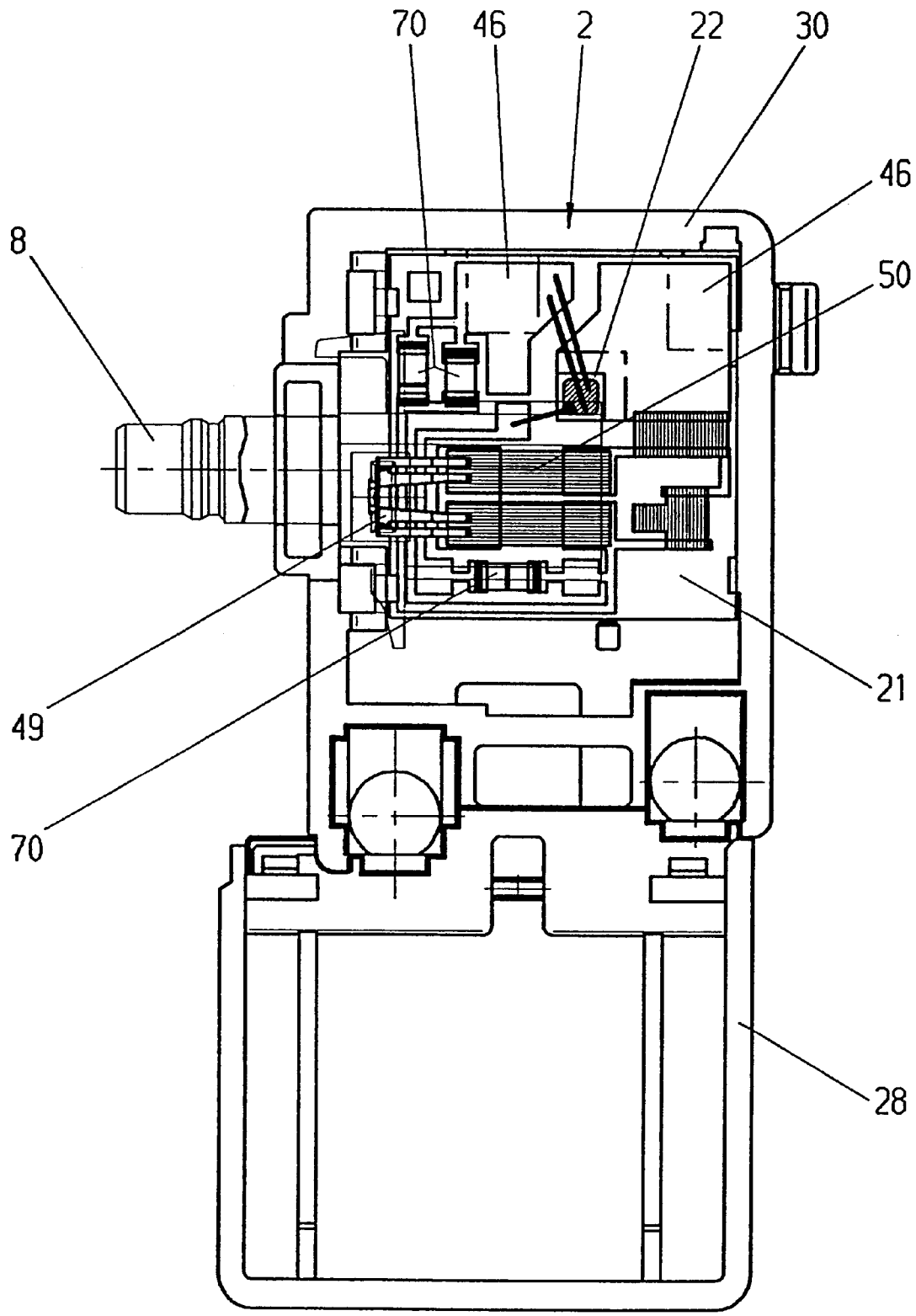
FIG. 4 shows a section along the line 4—4 in FIG. 3.

If the second contact system 11 is not closed, then the electrical connection from the current-carrying rail 18 to the first output connection 5 is produced via the power semiconductor 22 in the control electronics device 63. To this end, there is an electrical connection 24 from the fixed contact 13 of the contact system 11 to the control electronics device 63, and an electrical connection 23 from the current-carrying rail 18 to the control electronics device 63. The control electronics device 63 is located on a circuit base 21, which is arranged in the housing 2, as can be seen in FIG. 4. The circuit base 21 may be a printed circuit board, a ceramic plate or the like. Furthermore located on the circuit base 21 are the power semiconductor 22 as well as the potentiometer track 50, with which a wiper 49 is in contact, this wiper 49 being located on the carriage 9 and thus being movable by the operating element 7.

Figure 5:
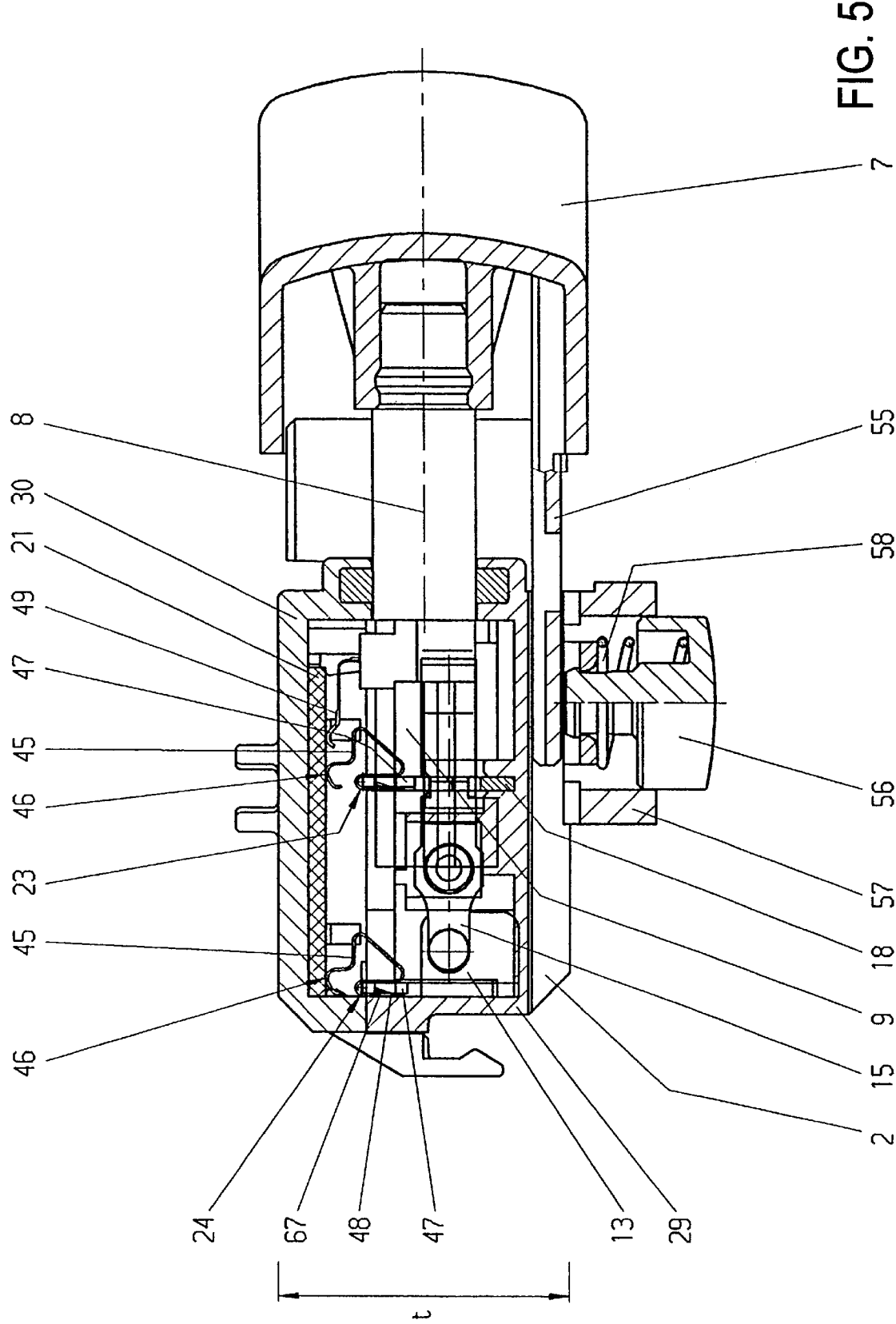
FIG. 5 shows a section along the line 5—5 in FIG. 2.

The electrical connections 23, 24 are preferably designed as contact springs 45. As can be seen in FIG. 5, the contact spring 45 has a shape approximately in the form of a heart and is designed to be open at the side facing the current-carrying rail 18 and an attachment 47 on the fixed contact 13. The contact spring 45 rests in an elastically sprung manner against a contact surface 46 on the circuit base 21. The contact spring 45 may be composed of bronze, beryllium-copper or the like. It is possible for the contact spring 45 to be fastened to an attachment 47 on the fixed contact 13 of the further contact system 11 or of the current-carrying rail 18. This fastening is produced in such a manner that the contact spring 45 can rotate slightly on the attachment 47. For example, the contact spring 45 may be plugged onto the attachment 47 by means of a U-shaped part 48, and may be swaged to the attachment 47, with a certain amount of play being provided. It is also possible to latch the U-shaped part 48 by means of a spring limb 67, which engages in a window 68 (which can be seen in FIG. 9 or 11) on the attachment 47, so as to achieve the capability to rotate slightly. This allows compensation for unevenness and tolerances on the circuit base 21. The described refinement of the contact spring 45 advantageously offers a large spring force and, nevertheless, a low physical height.

As can be seen in FIG. 2, a receptacle 28 for a suppression capacitor 27 can be arranged on the housing 2. In the transverse direction as shown by the arrow 65, the receptacle 28 is adjacent to the housing 2 on the side on which the input connections 3, 4 are located. In order to make contact with the suppression capacitor 27, an extension which runs between the two input connections 3, 4 is formed, as the first connection 25, at the start of the current-carrying rail 18. A second connection 26 for the suppression capacitor 27 is connected to the second input connection 4, via the electrical connecting part 17. The connections 25, 26 for the suppression capacitor 27 are designed in the manner of a plug-in connection, so that, for assembly, the suppression capacitor 27 just has to be inserted into the receptacle 28, being plugged into the connections 25, 26.

Figure 10:
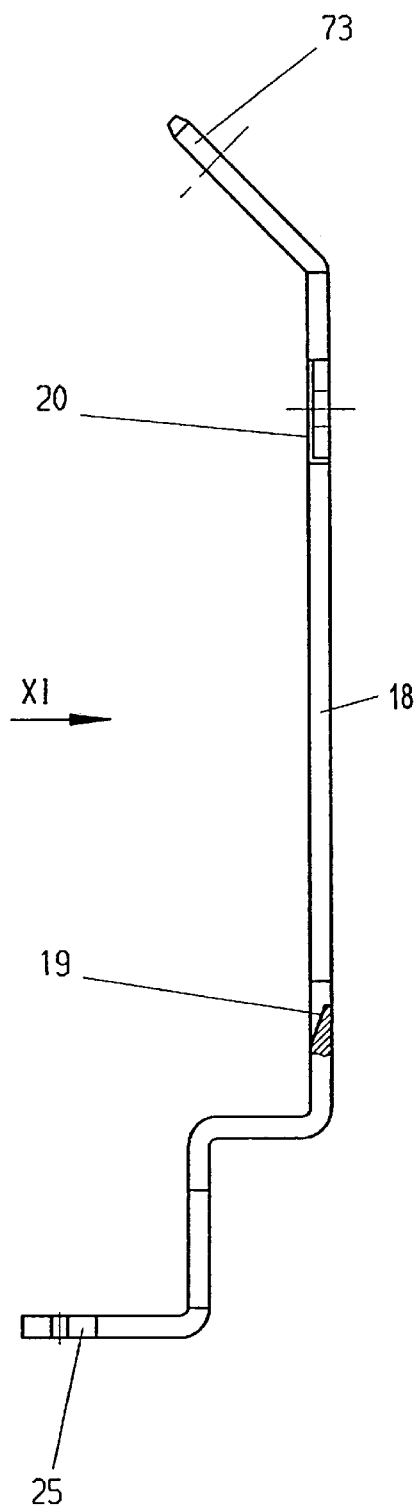
FIG. 10 shows the current-carrying rail as an individual part.
Figure 11:
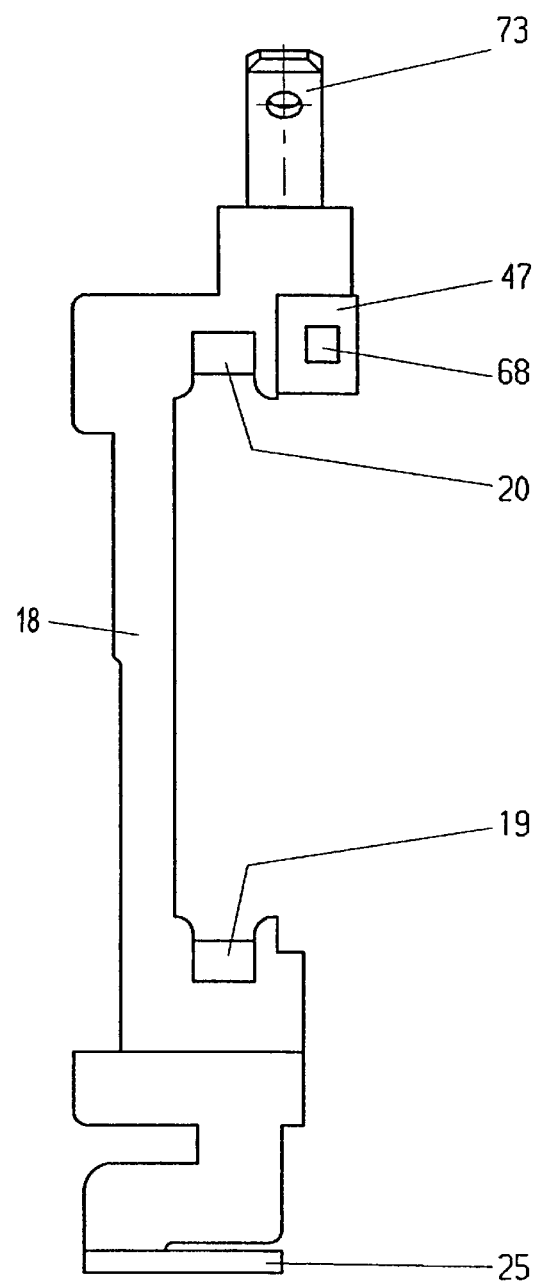
FIG. 11 shows the current-carrying rail in the direction XI from FIG. 10.

As can be seen in particular from FIGS. 10 and 11, the current-carrying rail 18 forms an integral, common bearing part with the rotating bearings 19, 20 for the switching contact 14 of the contact system 10 for the supply voltage, for the switching contact 15 of the contact system 11 for bridging the control electronics device 63, and for the connection 25 of the suppression capacitor 27. As can be seen in FIGS. 6 and 7, the second connection 26 for the suppression capacitor 27 is also integrally formed on the U-shaped connecting part 40. A type of supporting point clamp is thus produced for the connection for the field winding 62 of the electric motor 61 via the connecting tab 42, for the suppression capacitor 27 and for the second input connection 4 for the mains.

Figure 13:
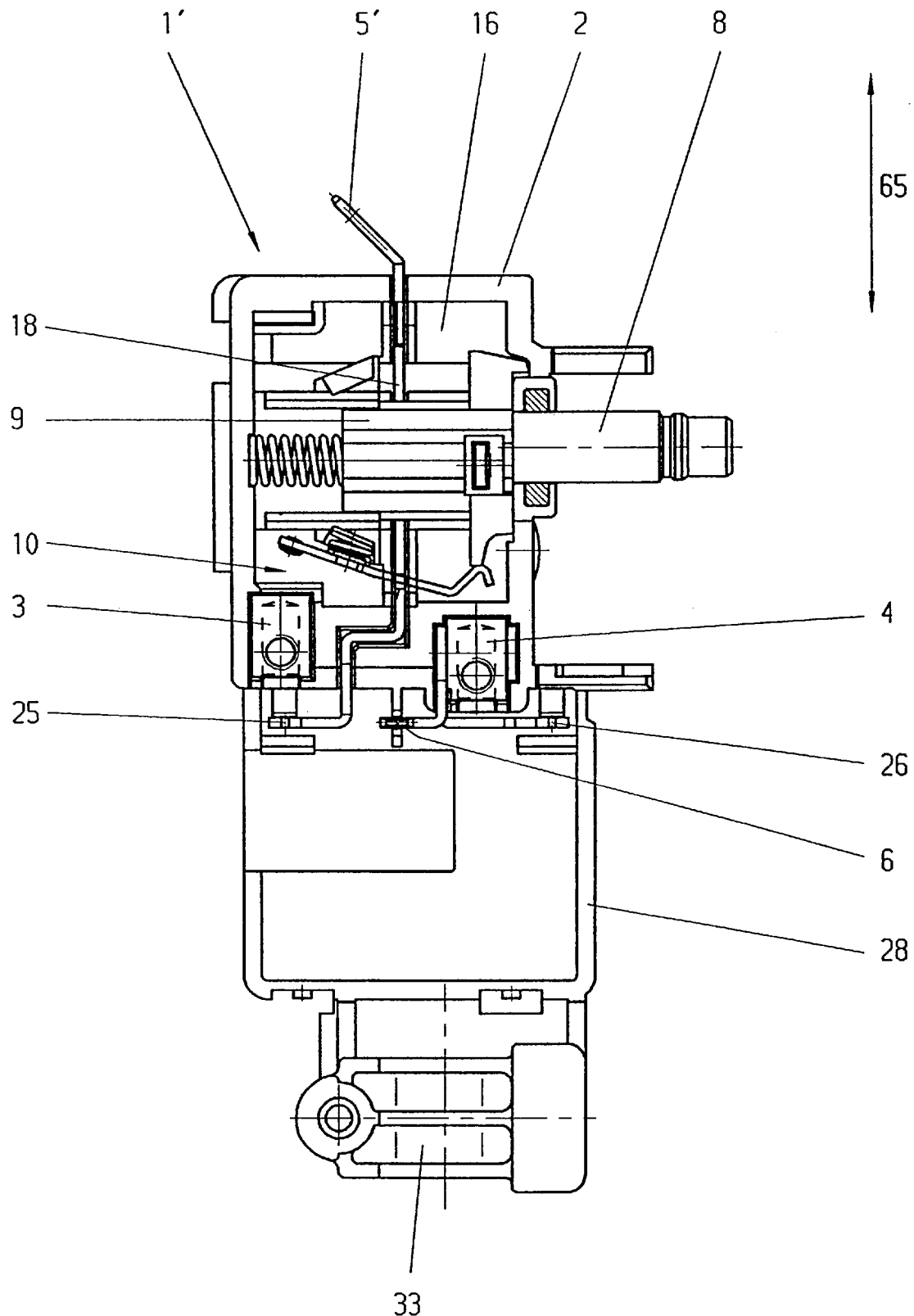
FIG. 13 shows a further embodiment of a switch as in FIG. 2.

Another embodiment of the invention, which is shown in FIG. 13, relates to an on/off switch 1' without any control electronics device for an electrical tool. Since there is no control electronics device, the further contact system for bridging is also not present, so that the housing 2 contains only the contact system 10 for switching the supply voltage. The output connection 5' for the field winding 62 is directly and integrally formed at the end of the current-carrying rail 18 running in the transverse direction, as shown by the arrow 65, on the side opposite the contact system 10, for example as the connecting tab 73 which is shown in FIGS. 10 and 11 and passes through the housing 2. This embodiment of the switch 1' thus also has essentially the same current routing in the housing interior 16 as the switch 1 which is provided with the control electronics device 63.

By virtue of the described arrangement of the contact systems 10, 11 in the housing 2 and/or the current routing in the housing interior 16, it is possible to design a compact, physically small and highly integrated switch 1, which is particularly suitable for use in electrical tools having thin handles. In a development of the invention, the refinement of the housing 2 contributes even further to improving the compactness.

For this development, the housing 2 can be split into two parts. To this end, the housing 2 is split into a base 29 and a cover 30 in a separating plane which is covered by the longitudinal direction and the transverse direction as shown by the arrows 64 and 65 in FIG. 2. In the view shown in FIG. 3, the separating plane runs approximately along the line 4—4. The base 29 which is shown in more detail in FIG. 2 is used to accommodate the individual parts of the switch 1, namely, inter alia, those of the contact systems 10, 11, of the input connections 3, 4, of the output connections 5, 6 and of the current-carrying rail 18. The carriage 9 and that part of the shaft 8 of the operating element 7 which projects into the housing interior 16 are preferably also located in the base 29. The cover 30 closes the base 29 and, according to FIG. 4 contains in its interior the circuit base 21, which is arranged in a plane which is covered by the longitudinal direction and the transverse direction as shown by the arrows 64, 65 and runs parallel to the shaft 8 of the operating element 7.

Figure 3:
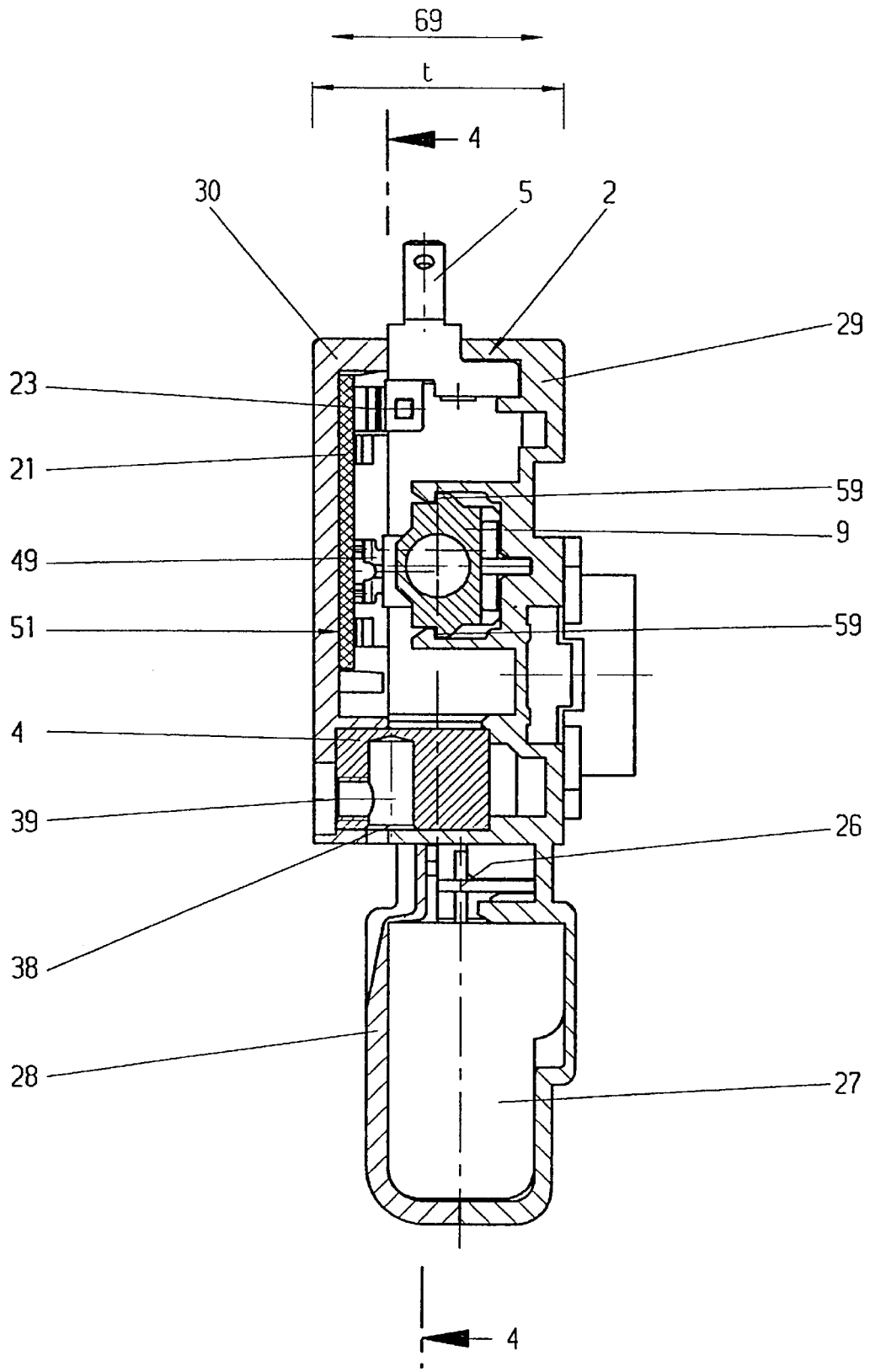
FIG. 3 shows a section along the line 3—3 in FIG. 2.

The base 29 contains a guide 59 for the carriage 9 which may be designed, for example, like a tongue and groove connection, as shown in FIG. 3, or a dovetail or the like, so that the carriage 9 is held down in the base 29. The guide 59 at the same time represents an assembly aid, since said guide 59 prevents the carriage 9 and the shaft 8 from falling out of the base 29 during assembly. Furthermore, the guide 59 also improves the mobility of the carriage 9 since, unlike the situation in the past, the guidance is produced by contact on the cover 30. Conversely, the guide together with the carriage 9 and the shaft 8, possibly as well as other electrical components, can also, of course, be arranged in the cover 30 instead of in the base 29.

Corresponding to FIG. 2, at least one guide surface 60 (which runs in a longitudinal direction as shown by the arrow 64 and parallel to the shaft 8 of the operating element 7) for the operating element 7 is located on the outside of the base 29 or of the cover 30. Two such guide surfaces 60, 60' are preferably arranged opposite one another in the transverse direction as shown by the arrow 65. The operating element 7 engages over these guide surfaces 60, 60', so that when the operating element 7 is moving, these guide surfaces 60, 60' enter the interior of the operating element 7. This also contributes to further reducing the extent of the switch 1 in the longitudinal direction as shown by the arrow 64.

In order to reduce the size of the housing 2 in the depth direction as shown by the arrow 69 (see FIG. 3) that is at right angles to the longitudinal direction and transverse direction as shown by the arrows 64, 65, the power semiconductor 22 is preferably located unhoused, directly on the circuit base 21, as can be seen in more detail in FIG. 4. For fastening, the power semiconductor 22 can be soldered on the circuit base 21. The power semiconductor 22 and the component side for the electrical components 70 of the circuit base 21 face the switching contacts 14, 15. The circuit base 21 rests with its side opposite the component side directly against one wall 51 in the housing interior 16, to be precise in the cover 30, as can be seen in particular in FIG. 3. If it is necessary owing to the power loss in the power semiconductor 22, the circuit base 21 may also rest against the wall 51 via a heat sink, such as a copper plate or the like.

As can be seen from FIGS. 2 and 4, the receptacle 28 for the suppression capacitor 27 is composed of two halves which are split in a separating plane which is covered by the longitudinal direction and transverse direction as shown by the arrows 64 and 65 and likewise runs approximately along the section line 4—4 in FIG. 3. The two halves are expediently integrally formed with the base 29 and the cover 30. The receptacle 28 has a cutout 31, running in the transverse direction as shown by the arrow 65, to the outside of the housing 2 through which a grounding connection 32 or a mid-potential connection of the suppression capacitor 27 can pass.

As can be seen in FIG. 2, a cable clamp 33 can be connected to the receptacle 28 for the suppression capacitor 27 on the housing 2, in the transverse direction as shown by the arrow 65. The cable clamp 33 holds the mains cable of the electrical tool, which leads to the input connections 3, 4. If there is no receptacle 28 for a suppression capacitor 27, the cable clamp 33 can also be connected directly to the housing 2 on the side on which the input connections 3, 4 are located. The cable clamp 33 comprises a cable holder 34 with a projecting web 35, and a clamp 36 which is hooked into the web 35. The clamp 36 can be attached to the cable holder 34 by means of a screw 37.

Figure 15:
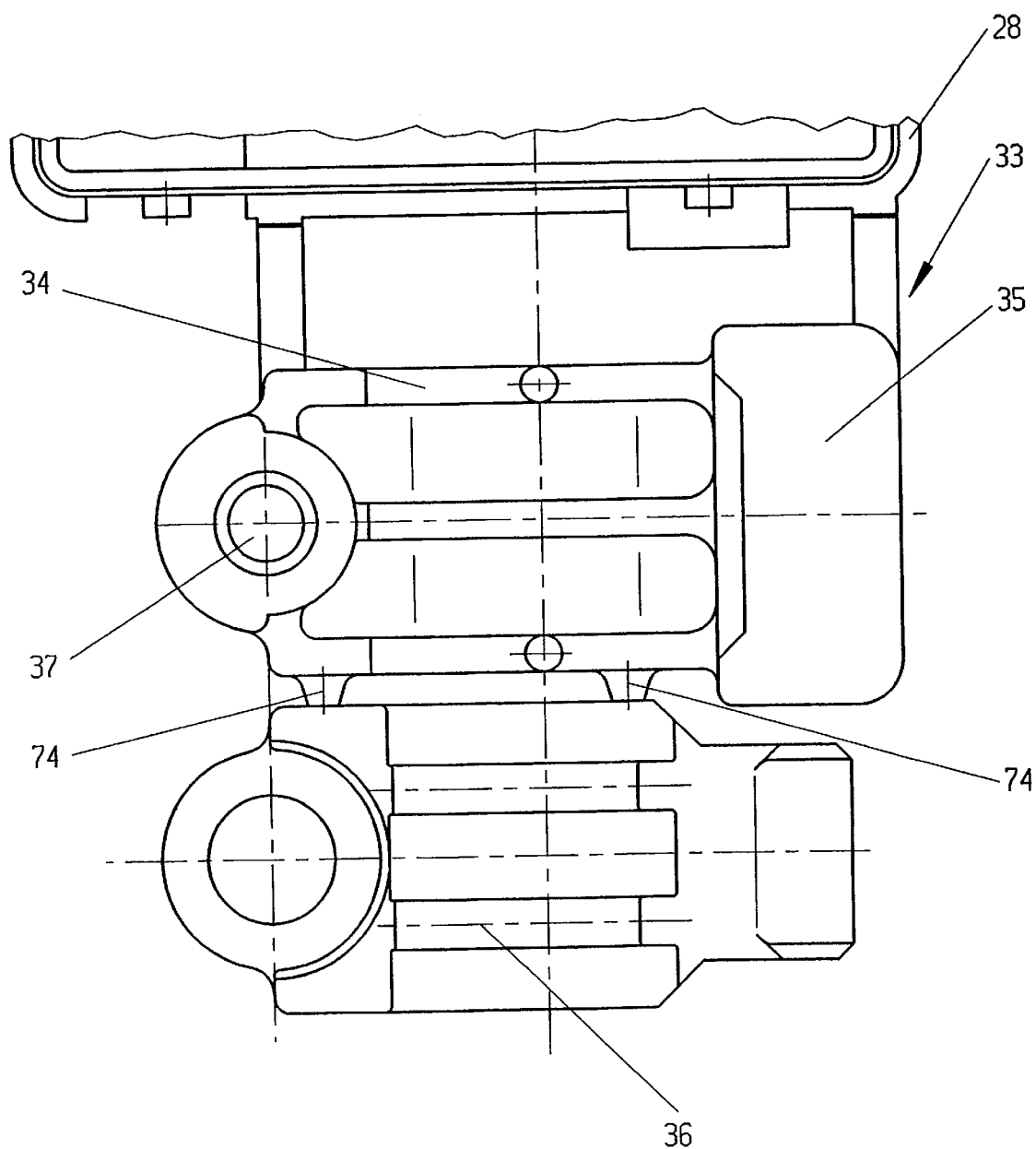
FIG. 15 shows a detail of the housing in the region of the cable clamp.

The clamp 36 may have two surfaces of different curvature, in which case one surface may also be designed to be straight. By rotating the clamp 36 through 180 degrees, mains cables of different diameter can be held in the cable clamp 33. The clamp 36 is thus designed symmetrically in the region of the screw 37 and of the projecting web 35, and asymmetrically in the clamping region for the mains cable. Furthermore, hooking the clamp 36 into the web 35 produces a certain amount of play, which assists the accommodation of mains cables with different diameters. The cable holder 34 and the web 35 are expediently integrally integrated on the housing 2, preferably in the base 29. The cable clamp 33 is expediently composed of the same plastic as the housing 2, for example glass-fiber-reinforced polyamide. The clamp 36 can thus be molded on one side of the cable holder 34 with a weak point 74 during the production of the base 29, as is shown in FIG. 15, so that, when the switch 1 is being installed in the electrical tool, the clamp 36 can be broken off and, once the mains cable has been fitted to the switch 1, can be hooked into the web 35 and fastened to the cable holder 34 in order to complete the cable clamp 33.

A control wheel 52 having an axis 54 which is mounted in the operating element 7 such that it can rotate can be provided on the switch 1, as is shown in FIG. 2, making it possible to set an adjustable rotation speed limit, below the maximum possible rotation speed of the electric motor 61. As can also be seen from FIG. 12, a locking slide 55 is held on the operating element 7, is guided on the outside of the housing 2, and is adjustable in the longitudinal direction as shown by the arrow 64 (see FIG. 2), via a thread 61, by rotating the control knob 52. Located on the side of the locking slide 55 associated with the control wheel 52 there is a stop 53 which interacts with the housing 2. When the locking slide 55 is being adjusted, the stop 53 is likewise adjusted and the distance through which the operating element 7 can move is thus limited to an adjustment distance which is less than the maximum possible adjustment distance, as a result of which the rotation speed which can be set by the operating element 7 is limited accordingly.

Figure 12:
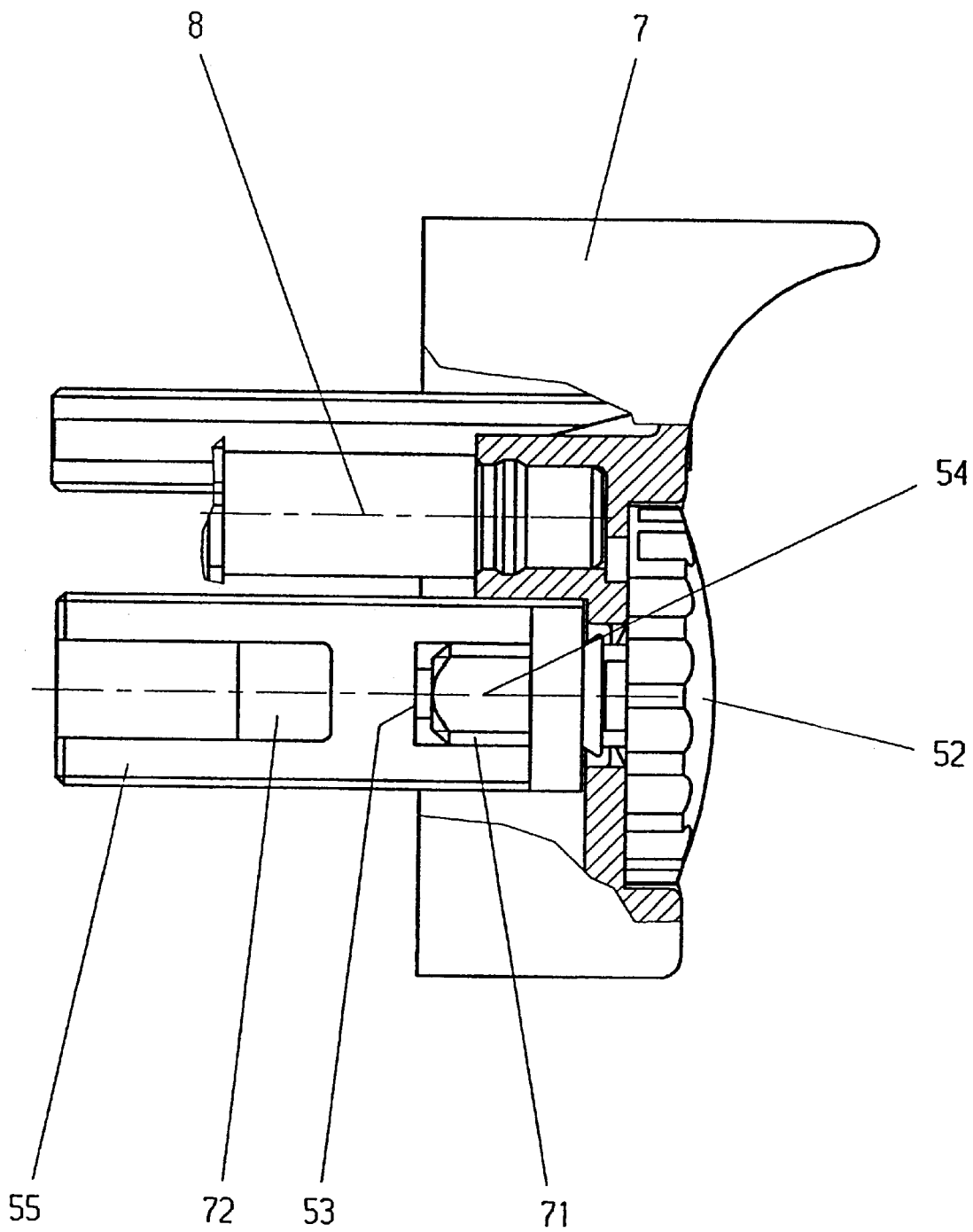
FIG. 12 shows the operating element as an individual part, partially in section.

The operating element 7 can be fixed at the maximum adjustment distance corresponding to the rotation speed limit setting by virtue of the fact that a locking knob 56 interacts with the locking slide 55, as can be seen in more detail in FIG. 5. The locking knob 56 is mounted in a dome 57, which is located on the outside of the housing 2. A spring 58 which enters the locking knob 56 is in turn located in the dome 57, with respect to which spring 58 the locking knob 56 can move in such a manner that the said locking knob 56 is completely recessed in the dome 57. For locking, the recessed locking knob 56 engages in a recess 72 in the locking slide 55, as can be seen in FIG. 12. The fact that the spring 58 enters the locking knob 56 means that the dome 57 for the locking knob 56 can be kept very flat.

The control wheel 52 is arranged in such a manner that its axis 54 in the transverse direction as shown by the arrow 65 is offset with respect to the shaft 8 of the operating element 7, as can be seen in particular in FIG. 2. The locking slide 55 is likewise arranged offset with respect to the shaft 8 of the operating element 7 in the transverse direction as shown by the arrow 65 and, possibly, in the depth direction as shown by the arrow 69 (see FIG. 3), as can be seen from FIGS. 2 and 5. In the case of conventional electrical tool switches with a lock arranged on the side on the housing, the control wheel and the locking slide are located coaxially with the shaft of the operating element. Thus, in contrast to previous electrical tool switches, both the control wheel 52 and the locking slide 55 are arranged offset with respect to the shaft 8 of the operating element 7, the locking slide 55 running rotated through about 90 degrees and at an angle with respect to the shaft 8, so that there is a certain amount of asymmetry between the control wheel 52 and the operating element 7. This asymmetric arrangement of the control wheel 52 and the locking slide 55 as well as the flat dome 57 with a locking knob 56 that can be completely recessed contribute to the design of the switch 1 being very thin.

The electrical switch 1 according to the invention is, as already mentioned, particularly suitable for arrangement in a thin, ergonomically designed handle of an electrical tool. In the following text, the intention is to describe the details relating to the preferred dimensioning for the housing 2 of such an electrical tool switch in which case, corresponding to FIG. 2, the housing 2 has a length l running in the longitudinal direction as shown by the arrow 64, a width b running in the transverse direction as shown by the arrow 65, and a depth t running, corresponding to FIG. 3, in the depth direction as shown by the arrow 69.

The length l of the housing interior 16 corresponds approximately to the length of the switching contact 14, 15. The width b of the housing interior 16 corresponds essentially to the sum of the heights of the two contact systems 10, 11 as well as the diameter of the shaft 8 of the operating element 7 or, possibly, the height of the carriage 9 as well as, possibly, the height of the input connection 3, 4. If the output connection 5, 6 is located in the housing interior, its height can also be added. The depth t of the housing interior 16 is slightly greater than the width of the switching contact 14, 15 plus the width of any additional electrical components which may be contained in the housing interior 16, such as the wiper 49 for the potentiometer track 50, and the circuit base 21. Preferably, the depth t is approximately up to three times the width of the switching contact 14, 15. The respective wall thicknesses for the housing 2 are then also added to the length l, width b and depth t of the housing 2.

In one specific embodiment of such a switch 1, the length l of the housing interior 16 may be between 18 and 25 mm, in particular about 21 mm. The width b of the housing interior 16 may be between 30 and 40 mm, in particular about 33 mm. The depth t of the housing interior 16 is in turn chosen to be between 10 and 20 mm, in particular about 13 mm. The wall thicknesses for the housing 2 are between 0.5 and 4 mm. Furthermore, the receptacle 28 which may be located on the housing 2 for the suppression capacitor 27 has a length l of between 20 and 35 mm, in particular of about 27 mm, as well as a width b of between 15 and 30 mm, in particular of about 24 mm. The cable clamp 33 which may also be arranged on the housing 2 has a length l of between 20 and 30 mm, in particular of about 24 mm, as well as a width b of between 10 and 20 mm, in particular of about 15 mm. The depths t for the receptacle 28 and the cable clamp 33 may, if required, be chosen to be somewhat less than for the rest of the housing 2.

The invention is not limited to the exemplary embodiments described and illustrated. In fact, it also covers all developments by a person skilled in the art within the context of the idea of the invention. For example, such a switch may be used not only on an electrical tool operated using the mains AC voltage but also on an electrical tool operated with DC voltage from a rechargeable battery. In this case, an FET, MOSFET or the like is used as the power semiconductor. Furthermore, such a switch can also be used in any other electrical devices supplied from a voltage source, such as gardening equipment, kitchen equipment etc.

What is claimed is:

1. An electrical switch comprising:
    a housing having first and second input connections for electrical connection to a voltage source and further having first and second output connections for electrical connection to an electrical device, said second input connection having an electrical connecting part for connection to said second output connection;
    an operating element which can be moved manually;
    a first contact system which includes a fixed contact and a contact rocker, said contact rocker having first and second lever arms and a rotating bearing, said first lever arm in communication with said fixed contact, said fixed contact being directly connected to said first input connection, and wherein said first lever arm is biased by a spring force in a closing direction toward said fixed contact and said operating element during its movement acts upon said second lever arm in such a way that said first lever arm can be placed against said fixed contact in order to close an electrical connection of the contact system; and
    a current-carrying rail arranged in a central region of said housing, said current-carrying rail establishing an electrical connection to said first output connection, said rotating bearing of said contact rocker being arranged on said current-carrying rail in a region near said first and second input connections;
    wherein said current-carrying rail extends from a region between the first and second input connections to a region of said first output connection and passes through the housing in a transverse direction approximately at right angles to the direction of movement of the operating element.

2. The electrical switch according to claim 1, wherein the electrical connection between the current-carrying rail and the first output connection can be switched by the operating element by means of an additional contact system located in said housing.

3. The electrical switch according to claim 2, further comprising:
    a control electronics device having a power semiconductor arranged in said housing, said control electronics device adjusting operational features of an electrical device connected to the electrical switch; and
    an electrical extension connecting said current-carrying rail to said control electronics device,
    wherein said additional contact system has a switching contact having two lever arms and a rotating bearing, said additional rotating bearing being located on the current-carrying rail in the region of said first output connection, the contact rocker of said first contact system and said additional switching contact being arranged opposite one another in the transverse direction.

4. The electrical switch according to claim 1, further comprising:
    a first extension formed in a region of said first input connection of said current-carrying rail, said first extension serving as a first connection for a suppression capacitor; and
    a second extension formed in the region of said second input connection of said current-carrying rail, said second extension serving as a second connection for the suppression capacitor, said first and second connections for said suppression capacitor being plug-in connections; wherein said current-carrying rail has a second end in the region of the first output connection and said first output connection is a connecting tab formed at the second end of said current-carrying rail.

5. The electrical switch according to claim 1, wherein the fixed contact is integrally formed with said first input connection, and the electrical connecting part of the second input connection comprises a U-shaped connecting part, said second input connection being plugged into said U-shaped connecting part by a spring limb, said U-shaped connecting part having an integral connecting tab used as the second output connection.

6. The electrical switch according to claim 2, further comprising:
    a fixed contact for the additional contact system, said fixed contact having a connecting tab which is the first output connection, said fixed contact for the additional contact system and said connecting tab being integrally formed.

7. The electrical switch according to claim 6, further comprising:
    a control electronics device located on said housing, said control electronics device adjusting operational features of an electrical device connected to the electrical switch,
    wherein there is an electrical connection between the fixed contract of the additional contact system and the control electronics device.

8. The electrical switch according to claim 3, further comprising:
    first and second contact springs respectively forming respective electrical connections from the control electronics device to the fixed contact of said additional contact system and from the control electronics device to said current-carrying rail, said first and second contact springs having an approximate heart-shape open at a side and resting in an elastically sprung manner against a contact surface on a circuit base, said first and second contact springs being fastened to an attachment on one of said fixed contact of said additional contact system and said current-carrying rail.

9. The electrical switch according to claim 8, wherein said first and second input connections integrally form a block having a receptacle with a screw connection for a supply lead to said voltage source, a surface of said first input connection forming said fixed contact of said first contact system;

wherein said first and second input connections, said contact springs, said current-carrying rail and said fixed contact of said second contact system are composed of metal having good electrical conductivity; and the said current-carrying rail and said fix contact of said second contact system are made as stamped and bent parts.

10. The electrical switch according to claim 9, wherein said current-carrying rail and said first input connection are composed of copper, said second input connection being composed of brass and said contact springs being composed of one of bronze and beryllium-copper.

11. The electrical switch according to claim 1, wherein said voltage source is a mains AC voltage, said first and second input connections being used as mains connections and said output connections being used as field connections for field windings of an electric motor.

12. The electrical switch according to claim 1, wherein said spring force acting on said first lever arm of said contact rocker is produced by a compression spring and wherein a stud on a shaft of said operating element acts on said second lever arm in such a manner that said contact rocker rests against said fixed contact of said first contact system respectively when said operating element has moved through a predetermined distance.

13. The electrical switch according to claim 1, a housing interior of said housing, said housing interior having a length, a width and a depth;

a shaft of said operating element located in said housing interior; and an additional contact system that can be switched by the operating element to establish the electrical connection to the current-carrying rail, an additional contact system that can be switched by the operating element to establish the electrical connection to the current-carrying rail, wherein said length corresponds approximately to a length of said contact rocker, wherein said depth is slightly greater than a width of said contact rocker plus the width of any additional electrical components contained within said housing up to three times the width of said contact rocker and wherein the contact system and the second contact system are arranged on mutually opposite sides of said shaft of said operating element.

14. The electrical switch according to claim 13, wherein the width of the housing interior corresponds approximately to one of a sum of heights of the first contact system, the additional contact system and the diameter of said shaft of said operating element, and a height of a carriage arranged on said shaft of said operating element.

15. The electrical switch according to claim 14, wherein said housing is divided into a base and a cover, said base accommodating at least one of said contact system, said additional contact system, said current-carrying rail, said carriage of said operating element and said shaft of said operating element; and said electric switch further comprises:

a guide and a device for holding down said carriage arranged in one of said base and said cover; wherein at least one guide surface which is approximately parallel to the shaft of said operating element is located outside of one of said base and said cover; and said operating element engages said at least one guide surface.

16. The electrical switch according to claim 3, further comprising:

a circuit base for said control electronics device arranged parallel to the shaft of said operating element, said circuit base being one of a print circuit board and a ceramic plate;

a carriage arranged on a shaft of said operating element; and a wiper located on said carriage and in contact with a potentiometer track on said circuit base, wherein said power semiconductor is located directly on said circuit base, said power semiconductor and a component side of said circuit base facing said contact rocker, said circuit base being placed with its side opposite said component side against a wall of said housing.

17. The electrical switch according to claim 1, further comprising:

a control wheel for adjusting a stop which interacts with said housing, said control wheel being arranged on said operating element in such a manner that an axis of said control wheel is offset in a traverse direction with respect to a shaft of said operating element;

a locking slide that can be adjusted by means of said control wheel, said locking slide being offset with respect to said shaft of said operating element and being fitted with said stop on a side associated with said control wheel; and a locking knob which interacts with a locking slide on said operating element, wherein the operating element can be fixed in specific movement positions by means of the locking knob, said locking knob being moveable in a dome against a spring located in said dome, said dome being located on an outside surface of said housing, and said spring enters said locking knob in such a manner that said locking knob can be completely recessed within said dome.

18. The electrical switch according to claim 4, further comprising a receptacle for said suppression capacitor, said receptacle being arranged on a side of said housing on which said first and second input connections are located in such a manner that said suppression capacitor makes contact with connections on said second input connection and said current-carrying rail.

19. The electrical switch according to claim 15, further comprising a cable clamp for a mains cable of an electrical tool, said cable clamp being adjacent to said first and second input connections, said cable clamp being integral to said base of said housing, said cable clamp comprising a cable holder having a projecting web and a clamp portion hooked into said web and removeably attached to said cable holder, said clamp portion having two surfaces of different curvature in order for the cable clamp to accommodate cables of different diameters by rotating said clamp portion.

20. The electrical switch according to claim 19, wherein said length of said housing interior is between 18 mm and 25 mm, said width of said housing interior is between 30 mm and 40 mm and the depth of said housing interior is between 10 mm and 20 mm;

said receptacle for said suppression capacitor has a length between 20 mm and 35 mm and a width of between 15 mm and 30 mm; and said cable clamp has a length between 20 mm and 30 mm and a width between 10 mm and 20 mm.

* * * * *